(12) United States Patent
Davies et al.

(10) Patent No.: US 11,779,990 B2
(45) Date of Patent: Oct. 10, 2023

(54) EXPANSION TOOL

(71) Applicant: MILWAUKEE ELECTRIC TOOL CORPORATION, Brookfield, WI (US)

(72) Inventors: Peter J. Davies, Milwaukee, WI (US); Alex R. Kuhls, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/716,773

(22) Filed: Apr. 8, 2022

(65) Prior Publication Data

US 2022/0324008 A1 Oct. 13, 2022

Related U.S. Application Data

(60) Provisional application No. 63/303,732, filed on Jan. 27, 2022, provisional application No. 63/172,874, filed on Apr. 9, 2021.

(51) Int. Cl.
*B21D 39/20* (2006.01)
*B25F 5/00* (2006.01)
(Continued)

(52) U.S. Cl.
CPC ............. *B21D 39/20* (2013.01); *B21D 37/04* (2013.01); *B21D 37/18* (2013.01); *B25F 5/001* (2013.01)

(58) Field of Classification Search
CPC ...... B21D 39/08; B21D 39/20; B21D 41/021; B21D 41/028; B21D 41/025; B21D 37/04; B29C 57/06; B29C 57/04; B29C 57/045
See application file for complete search history.

(56) References Cited

U.S. PATENT DOCUMENTS

| 1,404,819 A | 1/1922 | Wiedeke |
| 1,752,408 A | 4/1930 | Zein |

(Continued)

FOREIGN PATENT DOCUMENTS

| CN | 201346602 Y | 11/2009 |
| CN | 204018564 U | 12/2014 |

(Continued)

OTHER PUBLICATIONS

International Search Report and Written Opinion for Application No. PCT/US2022/024077 dated Jul. 27, 2022 (8 pages).

*Primary Examiner* — Bobby Yeonjin Kim
(74) *Attorney, Agent, or Firm* — Michael Best & Friedrich LLP

(57) ABSTRACT

An expansion tool includes a housing and a collar rotatably coupled to the housing. The collar includes a plurality of slots. The expansion tool further includes a plurality of jaws, each jaw having a projection received in a corresponding one of the plurality of slots such that the jaws are coupled for co-rotation with the collar. The expansion tool also includes a mandrel movable relative to the housing between a retracted position and an extended position, the mandrel engageable with the jaws to expand the jaws in response to movement of the mandrel to the extended position, and a drive mechanism including a rotatable cam. Rotation of the cam moves the mandrel between the retracted position and the extended position. The expansion tool further includes a rotation mechanism configured to incrementally rotate the collar.

19 Claims, 10 Drawing Sheets

(51) Int. Cl.
    *B21D 37/18*    (2006.01)
    *B21D 37/04*    (2006.01)

(56)             References Cited

U.S. PATENT DOCUMENTS

| | | | |
|---|---|---|---|
| 2,085,447 | A | 6/1937 | Plaine |
| 2,725,918 | A | 12/1955 | Deshler |
| 2,737,996 | A | 3/1956 | Toth |
| 2,835,307 | A | 5/1958 | Jorgensen |
| 2,999,529 | A | 11/1958 | Rast |
| 3,550,424 | A | 12/1970 | Rast |
| 3,677,684 | A | 7/1972 | Platz |
| 3,753,635 | A | 8/1973 | Barnett |
| 3,857,666 | A | 12/1974 | Barnett |
| 3,861,847 | A | 1/1975 | Barnett |
| 3,888,102 | A | 6/1975 | Nigido |
| 3,940,227 | A | 2/1976 | Strasser |
| 3,947,950 | A | 4/1976 | Adams |
| 4,034,591 | A | 7/1977 | Rothenberger |
| 4,107,249 | A | 8/1978 | Murai et al. |
| 4,144,735 | A | 3/1979 | Rothenberger |
| 4,154,083 | A | 5/1979 | Rothenberger |
| 4,397,173 | A | 8/1983 | Eftefield et al. |
| 4,425,783 | A | 1/1984 | Rast |
| 4,603,890 | A | 8/1986 | Huppee |
| 4,733,551 | A | 3/1988 | Bryant et al. |
| 4,735,078 | A | 4/1988 | Wesebaum |
| 4,890,472 | A | 1/1990 | Rothenberger |
| 5,046,349 | A | 9/1991 | Velte |
| 5,090,226 | A | 2/1992 | Takeoka et al. |
| 5,090,230 | A | 2/1992 | Koskinen |
| 5,135,268 | A | 8/1992 | McNaughton et al. |
| 5,243,845 | A | 9/1993 | Velte |
| 5,261,709 | A | 11/1993 | McNaughton et al. |
| 5,704,244 | A | 1/1998 | Halasz et al. |
| 5,727,414 | A | 3/1998 | Halasz et al. |
| 5,744,085 | A | 4/1998 | Soberg |
| 5,879,033 | A | 3/1999 | Hansel et al. |
| 5,943,891 | A | 8/1999 | Takagi et al. |
| 6,199,915 | B1 | 3/2001 | Becker |
| 6,783,160 | B2 | 8/2004 | Rowley |
| 6,862,766 | B2 | 3/2005 | Geurts |
| 7,014,214 | B2 | 3/2006 | Kaneko |
| 7,065,995 | B2 | 6/2006 | Frenken |
| 7,128,560 | B2 | 10/2006 | Tandart |
| 7,325,436 | B2 | 2/2008 | Cheng |
| 7,490,499 | B2 | 2/2009 | Suzuki et al. |
| 7,516,990 | B2 | 4/2009 | Jamison et al. |
| 7,681,636 | B2 | 3/2010 | Roggeband et al. |
| 7,735,877 | B2 | 6/2010 | Ito et al. |
| 7,806,213 | B2 | 10/2010 | Inoue et al. |
| 7,922,475 | B2 | 4/2011 | Gueit |
| 8,302,448 | B2 | 11/2012 | Woelcken et al. |
| 8,303,295 | B2 | 11/2012 | Gueit |
| 8,371,409 | B2 | 2/2013 | Inoue et al. |
| 8,511,133 | B1 | 8/2013 | Chen |
| 8,517,715 | B2 * | 8/2013 | Thorson ............ B29D 23/001 425/467 |
| 8,534,711 | B2 | 9/2013 | Inoue et al. |
| 8,562,331 | B2 | 10/2013 | Schramm et al. |
| 8,763,439 | B2 | 7/2014 | Thorson et al. |
| 9,027,966 | B2 | 5/2015 | Altmann et al. |
| 9,089,889 | B2 | 7/2015 | Kohnen |
| 9,248,617 | B2 | 2/2016 | Lundequist et al. |
| 9,808,852 | B2 | 11/2017 | Frenken |
| 9,862,137 | B2 | 1/2018 | Dickert et al. |
| 9,914,260 | B2 | 3/2018 | Ellice |
| 9,975,289 | B2 | 5/2018 | Li et al. |
| 9,993,961 | B2 | 6/2018 | Dickert et al. |
| 10,000,007 | B2 | 6/2018 | Dickert et al. |
| 10,195,783 | B2 | 2/2019 | Dickert et al. |
| 10,406,586 | B2 | 9/2019 | Frenken |
| 2005/0093298 | A1 | 5/2005 | Takayanagi |
| 2006/0201228 | A1 | 9/2006 | Rothenberger |
| 2007/0057393 | A1 | 3/2007 | Hartmann et al. |
| 2008/0122222 | A1 | 5/2008 | Sheppard |
| 2008/0160130 | A1 | 7/2008 | Gueit |
| 2010/0308503 | A1 * | 12/2010 | Schramm ............ B21D 41/026 264/312 |
| 2011/0239674 | A1 | 10/2011 | Defilippi |
| 2018/0029286 | A1 * | 2/2018 | Li ................. B21D 41/028 |
| 2018/0128323 | A1 | 5/2018 | Carlson |
| 2019/0351605 | A1 | 11/2019 | Trickle |
| 2020/0094465 | A1 * | 3/2020 | Lindsey .............. B29C 57/045 |
| 2020/0261958 | A1 | 8/2020 | Davies |
| 2020/0261959 | A1 | 8/2020 | Wekwert et al. |
| 2021/0254773 | A1 * | 8/2021 | Adelman .............. F16L 47/22 |
| 2022/0168793 | A1 | 6/2022 | Davies et al. |

FOREIGN PATENT DOCUMENTS

| | | |
|---|---|---|
| CN | 107838304 A | 3/2018 |
| CN | 207308769 U | 5/2018 |
| DE | 497609 C | 5/1930 |
| DE | 2800079 A1 | 7/1978 |
| DE | 3439522 A1 | 8/1985 |
| DE | 4003994 A1 | 8/1991 |
| DE | 4005474 A1 | 9/1991 |
| DE | 19730054 C1 | 3/1999 |
| DE | 19924695 A1 | 11/2000 |
| DE | 19963885 C1 | 5/2001 |
| DE | 40063517 A1 | 7/2002 |
| DE | 20301139 U1 | 6/2004 |
| DE | 102005033482 A1 | 1/2007 |
| DE | 102006015368 A1 | 10/2007 |
| DE | 202008002265 U1 | 4/2008 |
| DE | 202008002266 U1 | 4/2008 |
| DE | 102007053518 A1 | 5/2009 |
| DE | 102008061441 A1 | 7/2009 |
| DE | 102008064320 A1 | 6/2010 |
| DE | 102013208330 A1 | 11/2014 |
| EP | 0234283 A1 | 9/1987 |
| EP | 0397570 A1 | 11/1990 |
| EP | 0462719 A2 | 12/1991 |
| EP | 0567742 A2 | 11/1993 |
| EP | 0718057 A2 | 6/1996 |
| EP | 0878287 A1 | 11/1998 |
| EP | 0967427 A2 | 12/1999 |
| EP | 1118401 A1 | 7/2001 |
| EP | 1278001 A2 | 1/2003 |
| EP | 1930640 A1 | 6/2008 |
| EP | 2090384 A2 | 8/2009 |
| EP | 3520923 A1 | 8/2019 |
| FR | 2451235 A1 | 10/1980 |
| FR | 2645052 A1 | 10/1990 |
| GB | 1485098 A | 9/1977 |
| GB | 1524149 A | 9/1978 |
| WO | 8800503 A1 | 1/1988 |
| WO | 96020798 A1 | 7/1996 |
| WO | 96040457 A2 | 12/1996 |
| WO | 0189736 A1 | 11/2001 |

* cited by examiner

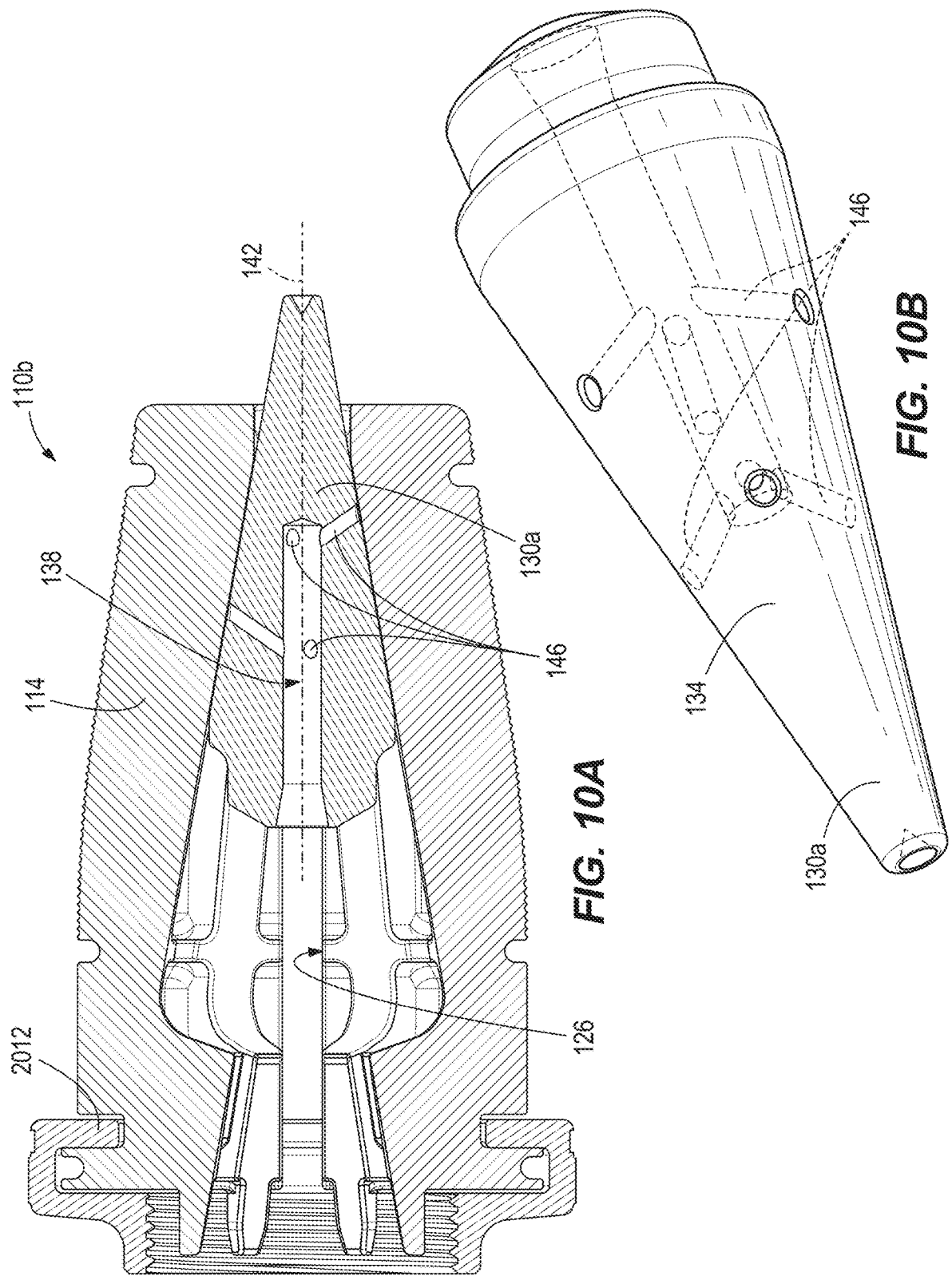

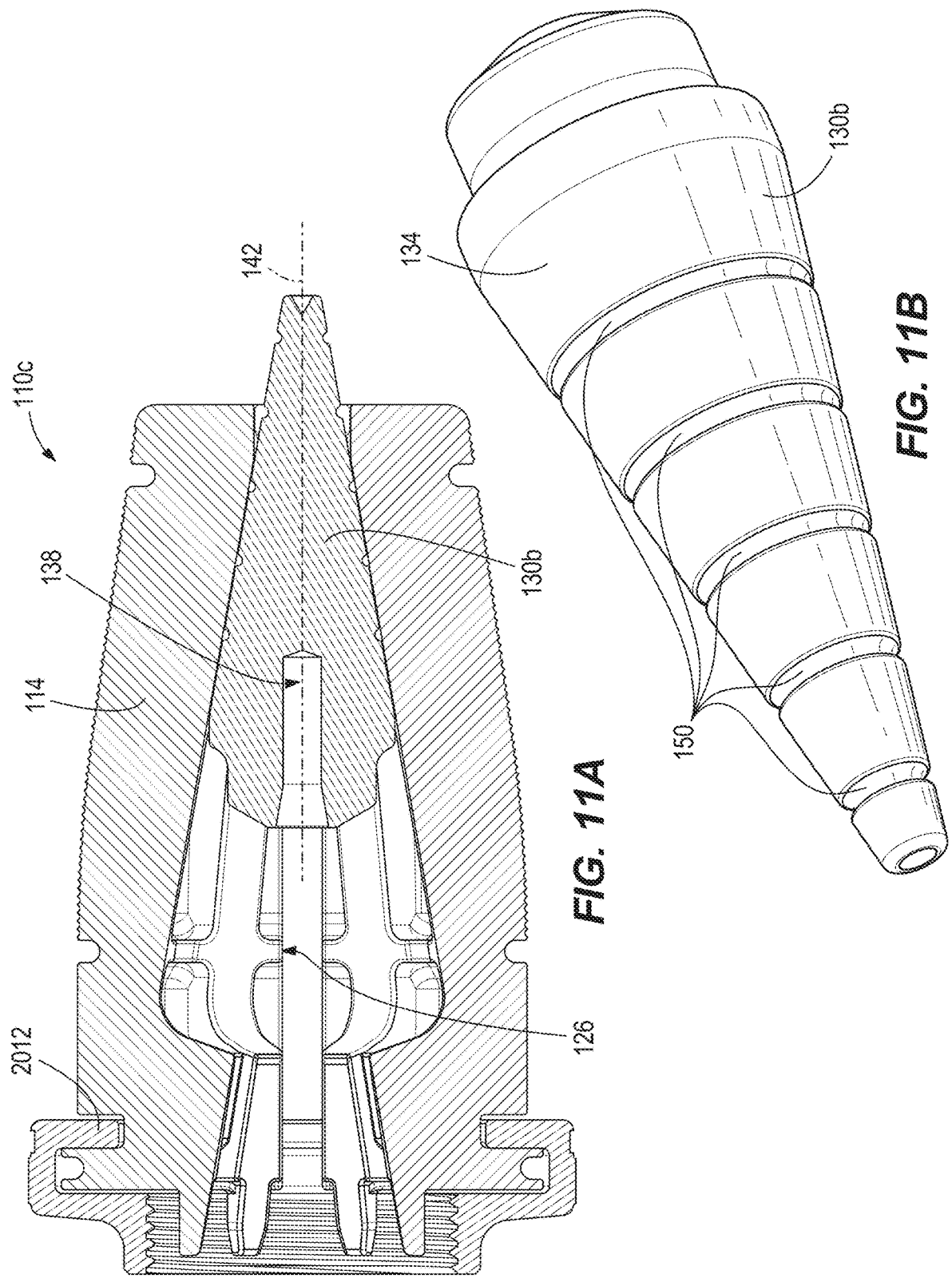

EXPANSION TOOL

CROSS-REFERENCE TO RELATED APPLICATIONS

The present application claims priority to U.S. Provisional Patent Application No. 63/172,874, filed Apr. 9, 2021, and to U.S. Provisional Patent Application No. 63/303,732, filed Jan. 27, 2022, the entire contents of both of which are incorporated by reference herein.

FIELD OF THE INVENTION

The present disclosure relates to pipe and tubing expansion tools. More particularly, the present disclosure relates to PEX (cross-linked polyethylene) expansion tools.

BACKGROUND OF THE INVENTION

PEX tubing is commonly used in plumbing applications as a substitute for copper pipe. PEX tubing can be coupled to fittings in various ways. Crimp rings or clamp rings can be compressed onto the outside of PEX tubing over a fitting to couple the PEX tubing to the fitting. Alternatively, the PEX tube can be expanded and the fitting inserted into the expanded end of the PEX tube. The PEX tube elastically recovers around the fitting to form a tight connection. Tools used to expand PEX tube for this purpose are referred to as PEX expansion tools.

SUMMARY OF THE INVENTION

The present invention provides, in a first aspect, an expansion tool including a housing and a collar rotatably coupled to the housing. The collar includes a plurality of slots. The expansion tool further includes a plurality of jaws, each jaw having a projection received in a corresponding one of the plurality of slots such that the jaws are coupled for co-rotation with the collar. The expansion tool also includes a mandrel movable relative to the housing between a retracted position and an extended position, the mandrel engageable with the jaws to expand the jaws in response to movement of the mandrel to the extended position, and a drive mechanism including a rotatable cam. Rotation of the cam moves the mandrel between the retracted position and the extended position. The expansion tool further includes a rotation mechanism configured to incrementally rotate the collar.

In some embodiments, the expansion tool further includes cone disposed between the plurality of jaws.

In some embodiments, the cone includes a plurality of grooves containing grease to lubricate interior surfaces of the plurality of jaws.

In some embodiments, the collar may include a front surface facing the jaws, and the slots may extend in a rearward direction from the front surface.

In some embodiments, the collar may include a plurality of teeth extending in a forward direction from the front surface.

In some embodiments, the plurality of jaws may be removably coupled to the housing.

In some embodiments, the plurality of jaws may be a first plurality of jaws, and the first plurality of jaws may be interchangeable with a second plurality of jaws configured to be removably coupled to the housing.

In some embodiments, each jaw of the second plurality of jaws may include a recess formed in a rear surface of the jaw, and each recess may be configured to receive a corresponding one of the plurality of teeth to couple the second plurality of jaws for co-rotation with the collar.

In some embodiments, the drive mechanism is operable in a high speed configuration and a low speed configuration, and the expansion tool further includes a shifting assembly including an actuator operable to shift the drive mechanism between the high speed configuration and the low speed configuration, and a shifting detector configured to detect a shift between the high speed configuration and the low speed configuration.

In some embodiments, the expansion tool further includes a cone received within the plurality of jaws and engageable with inner surfaces of the plurality of jaws, and the mandrel is configured to engage the cone to move the cone with the mandrel to expand the jaws as the mandrel moves toward the extended position.

In some embodiments, the cone includes a plurality of grooves containing grease to lubricate the inner surfaces of the plurality of jaws.

In some embodiments, the cone includes a plurality of bores extending from an outer conical surface to an inner bore, the bores defining fluid pathways to convey lubricant between the inner bore and an outer surface of the cone.

The present invention provides, in a second aspect, an expansion tool including a housing, a plurality of jaws, a mandrel moveable relative to the housing between a retracted position and an extended position, the mandrel engageable with the jaws to expand the jaws in response to movement of the mandrel to the extended position, a drive mechanism including a rotatable cam, wherein rotation of the cam moves the mandrel between the retracted position and the extended position, and wherein the drive mechanism is operable in a high speed configuration and a low speed configuration, a shifting assembly including an actuator operable to shift the drive mechanism between the high speed configuration and the low speed configuration, and a shifting detector configured to detect a shift between the high speed configuration and the low speed configuration.

The present invention provides, in a third aspect, an expansion tool including a housing, a collar rotatably coupled to the housing, a plurality of jaws coupled for co-rotation with the collar, a mandrel moveable relative to the housing between a retracted position and an extended position, the mandrel engageable with the jaws to expand the jaws in response to movement of the mandrel to the extended position, and a cone received within the plurality of jaws and engageable with inner surfaces of the plurality of jaws. The mandrel is configured to engage the cone to move the cone with the mandrel to expand the jaws as the mandrel moves toward the extended position. The expansion tool also includes a drive mechanism operable to move the mandrel between the retracted position and the extended position. The cone includes means for containing grease to lubricate the inner surfaces of the plurality of jaws.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

FIG. 10A is a cross-sectional view illustrating a third embodiment of a head for use with the expansion tool of FIG. 1.

FIG. 10B is a perspective view of an inner cone of the head of FIG. 10A.

FIG. 11A is a cross-sectional view illustrating a fourth embodiment of a head for use with the expansion tool of FIG. 1.

FIG. 11B is a perspective view of an inner cone of the head of FIG. 11A.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
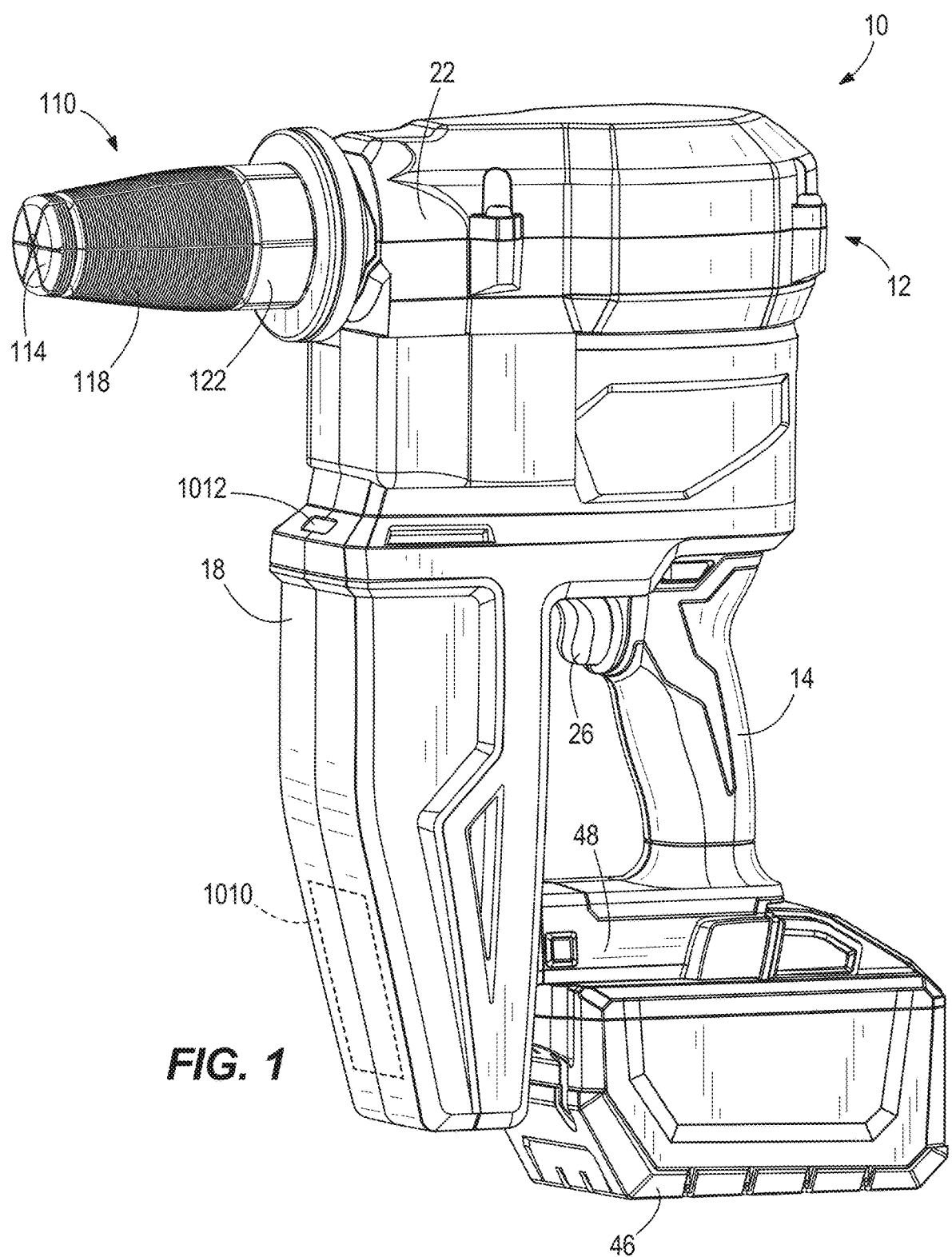
FIG. 1 is a perspective view of an expansion tool according to an embodiment of the present disclosure.

FIG. 1 illustrates an expansion tool 10 usable to expand PEX tubing prior to inserting a fitting. The expansion tool 10 includes a housing 12 with a handle portion 14 configured to be gripped by a user during operation of the expansion tool 10. The illustrated housing 12 also includes a motor housing portion 18 positioned in front of the handle portion 14, and a drive housing portion 22 positioned above the motor housing portion 18 and the handle portion 14. An actuator 26 (e.g., a trigger) for operating the expansion tool 10 is positioned on the handle portion 14. A motor 30 (e.g., a brushless DC electric motor) is supported within the motor housing portion 18, and a drive mechanism 34 is supported within the drive housing portion 22 (FIG. 2).

The illustrated expansion tool 10 includes a battery 46 (FIG. 1) configured to provide electrical power to the motor 30 (e.g., in response to depressing the actuator 26). The battery 46 is preferably a rechargeable battery pack with a plurality of lithium-based cells and is removably coupled to a battery receptacle 48 located at a base of the handle 14 (FIG. 1). In some embodiments, the battery 46 has a nominal output voltage of about 18 volts. In other embodiments, the battery 46 has a nominal output voltage of about 12 volts. In other embodiments, the battery 46 may have other nominal output voltages (e.g., 24 volts, 36 volts, 40 volts, etc.).

Figure 2:
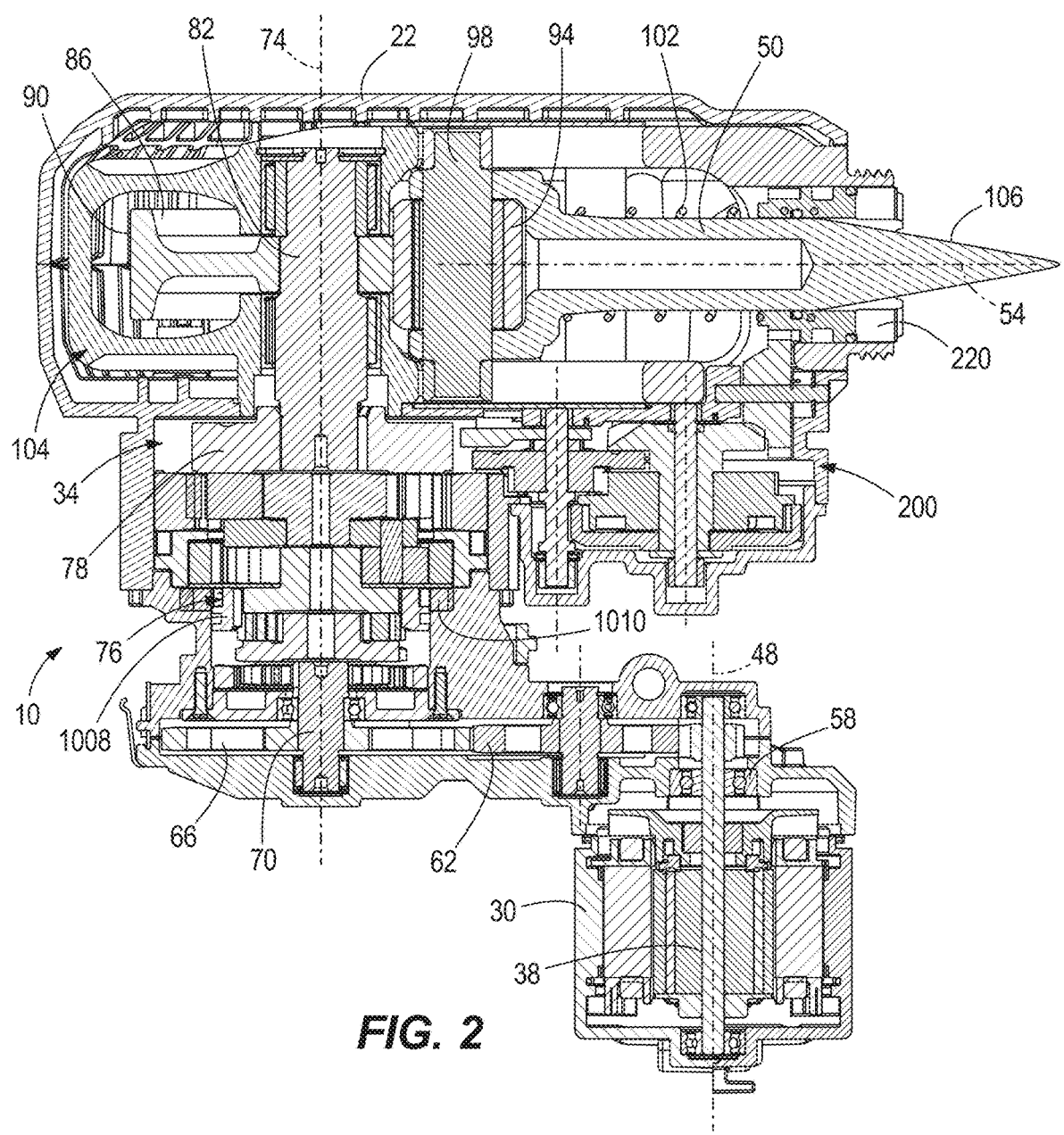
FIG. 2 is a cross-sectional view illustrating a drive assembly of the expansion tool of FIG. 1.

Referring to FIG. 2, the motor 30 includes a rotor or motor shaft 38 that rotates about a first axis or motor axis 42 to provide a rotational input to the drive mechanism 34. In the illustrated embodiment, the motor shaft 38 is rotationally supported by three bearings 43 spaced along the motor axis 42. The drive mechanism 34 converts the rotational input from the motor shaft 38 into a translational movement of a mandrel 50 along a second axis or mandrel axis 54. In the illustrated embodiment, the mandrel axis 54 is perpendicular to the motor axis 42, which contributes to a compact overall length of the expansion tool 10.

The illustrated drive mechanism 34 includes a first gear 58 coupled for co-rotation with the motor shaft 38 about the motor axis 42, a second gear 62 meshed with the first gear 58, and a third gear 66 meshed with the second gear 62. The drive mechanism 34 provides a speed reduction and torque increase from the motor shaft 38 to the third gear 66. For example, in the illustrated embodiment, the second gear 62 is larger in diameter and includes a greater number of teeth than the first gear 58, and the third gear 66 is larger in diameter and includes a greater number of teeth than the second gear 62.

With continued reference to FIG. 2, the third gear 66 is coupled for co-rotation with a shaft 70, such that the third gear 66 and the shaft 70 co-rotate together about a third axis or drive axis 74 that is parallel to the motor axis 42 and perpendicular to the mandrel axis 54. The shaft 70 provides a rotational input to a transmission 76, which in the illustrated embodiment is a multi-stage planetary transmission (e.g., a four-stage planetary transmission). In other embodiments, other types of transmissions 76 may be used. In the illustrated embodiment, the transmission 76 is shiftable to provide the expansion tool 10 with two different operating speeds.

Figure 3:
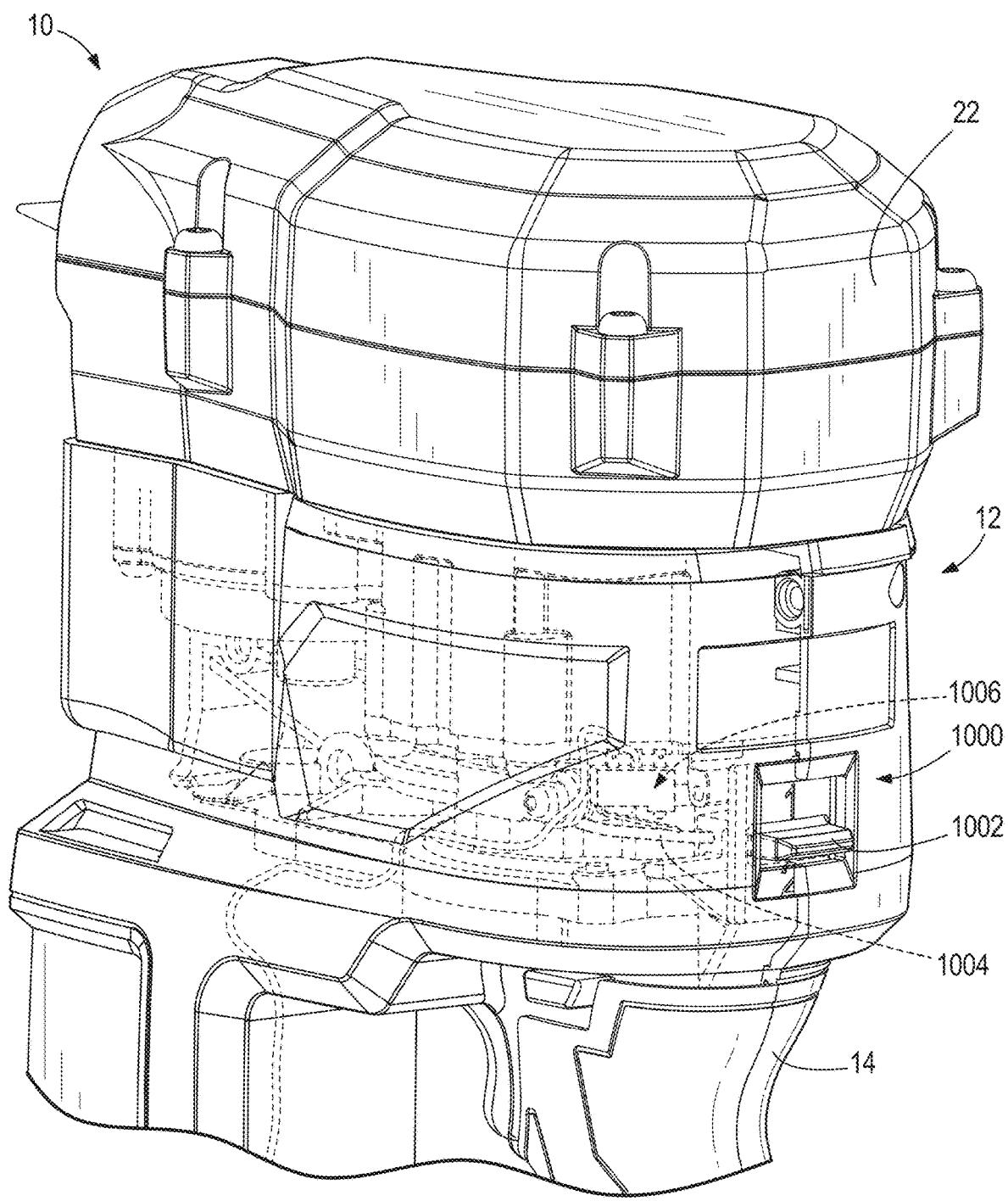
FIG. 3 is a perspective view of the expansion tool of FIG. 1, illustrating a shift actuator of the expansion tool.
Figure 4:
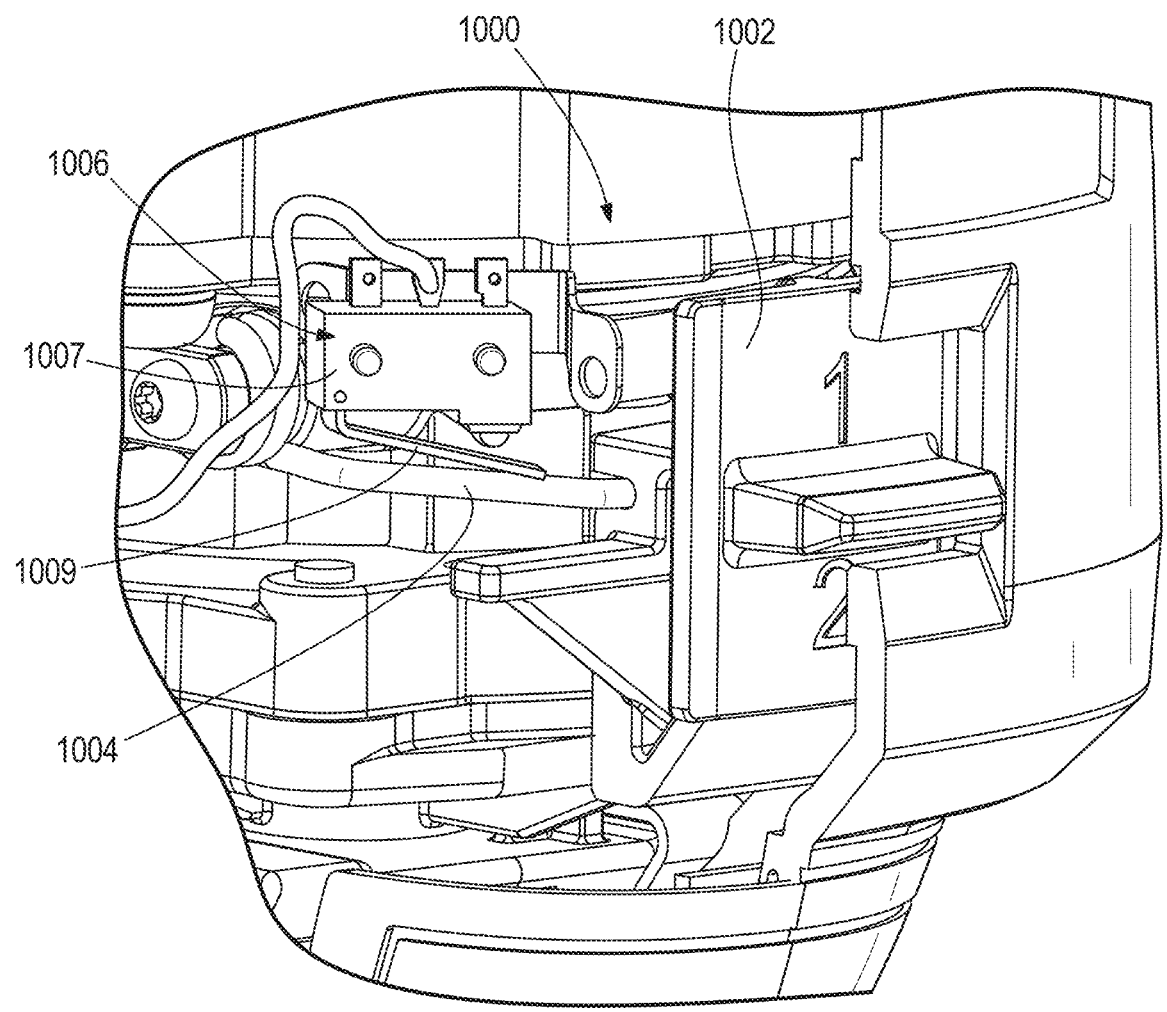
FIG. 4 is a perspective view of the expansion tool of FIG. 1 with portions removed, illustrating the shift actuator.

More specifically, with reference to FIGS. 3-4, the expansion tool 10 includes a shifting assembly 1000 which may alternate between a high speed configuration or a low speed configuration. The illustrated shifting assembly 1000 includes an actuator 1002 positioned on the housing 12 of the expansion tool 10 and a shifting arm 1004 connected to the actuator 1002. The actuator 1002 is located on a rear side of the housing 12, above the handle portion 14 in the illustrated embodiment; however, the actuator 1002 may be located in other positions on the housing 12 in other embodiments.

The shifting arm 1004 is coupled to a movable ring gear 1008 (FIG. 2), which is part of an intermediate stage of the multi-stage planetary transmission 76. The shifting arm 1004 is pivotable to translate movement of the actuator 1002 into axial movement of the movable ring gear 1008. When the shifting assembly 1000 is in the low speed configuration, the movable ring gear 1008 engages a locking ring 1010, which prevents the ring gear 1008 from rotating. When the shifting assembly 1000 is in the high speed configuration, the movable ring gear 1008 disengages from the locking ring 1010, permitting free rotation of the ring gear 1008.

Referring to FIG. 4, the shifting assembly 1000 includes a shifting detector 1006 configured to detect when the shifting assembly 1000 is actuated between the high speed configuration and the low speed configuration. In the illustrated embodiment, the shifting detector 1006 includes a micro switch 1007 with a spring lever 1009 that extends into the path of the shifting arm 1004. The shifting arm 1004 engages the spring lever 1009 to close the micro switch 1007 when the shifting assembly 1000 is in the high speed configuration. When the shifting assembly 1000 is moved to the low speed configuration, the spring lever 1009 moves with the shifting arm 1004 to open the micro switch 1007. In other embodiments, the position of the micro switch 1007 may be varied such that the micro switch 1007 is closed when the shifting assembly 1000 is in the low speed configuration and opens when the shifting assembly 1000 is moved to the high speed configuration.

The shifting detector 1006 is electrically coupled to a controller 1010 (FIG. 1) of the expansion tool 10. The controller 1010 includes a plurality of electrical and electronic components that provide power, operational control, and protection to the components and modules within the controller 1010. In particular, the controller 1010 may include, among other things, an electronic processor (e.g., a programmable microprocessor, microcontroller, or similar device), non-transitory, machine-readable memory, an input/output interface, and the like. The components and modules of the controller 1010 may be mounted on a PCB supported within the housing 12. The electronic processor is communicatively coupled to the memory and configured to retrieve from memory and execute, among other things, instructions related to the control processes and methods described herein.

The shifting detector 1006 provides a signal to the controller 1010 of the expansion tool 10 to indicate if a shift is taking place. For example, the controller 1010 may determine that a shift from the low speed configuration to the high speed configuration is taking place if the micro switch 1007 changes state from its open position to its closed position. The controller 1010 may similarly determine that a shift from the high speed configuration to the low speed configuration is taking place if the micro switch 1007 changes state from its closed position to its open position. In other embodiments, the shifting detector 1006 may include other sensors capable of determining whether a shift is taking place. For example, in other embodiments, the shifting detector 1006 may include one or more optical sensors, magnetic sensors, position sensors, or the like capable of determining whether a shift is taking place by monitoring movement of the actuator 1002, ring gear 1008, and/or the shifting arm 1004.

In the illustrated embodiment, the expansion tool 10 includes a light source 1012 positioned on a front side of the housing 12 (FIG. 1). The light source 1012 may be configured to illuminate a workpiece during operation of the expansion tool 10. The light source 1012 may also be controlled by the controller 1010 to provide an operator with visual feedback associated with operation of the shifting assembly 1000.

In operation, the shifting assembly 1000 may be in either the high speed configuration or the low speed configuration. When the operator depresses the actuator 26 and energizes the motor 30, the controller 1010 monitors the shifting detector 1006. If the operator attempts to shift the shifting assembly 1000 between the high speed position and the low speed position by actuating the actuator 1002 while the motor 30 is energized, the shifting detector 1006 provides a signal to the controller 1010 indicating that a shift is occurring. In response to this signal, the controller 1010 automatically deenergizes the motor 30. By deenergizing the motor 30, the gears of the transmission 76 slow, and adverse impacts on the gears that may occur by shifting during operation are lessened. In some embodiments, the controller 1010 may also control the light source 1012 to produce a predetermined blinking pattern in order to communicate to the operator that the shut off was intentional. In other embodiments, other indicators, including but not limited to audible indicators, colored LEDs, LED/LCD displays, or the like may be used to alert the user to the intentional shut-off of the motor 30. The operator can then resume operation by depressing the actuator 26 once more, thereby energizing the motor 30.

With reference to FIG. 2, the illustrated transmission 76 includes an output member 78 (i.e., a carrier of the final stage of the planetary transmission 76) coupled to a drive shaft 82 such that the drive shaft 82 co-rotates with the output member 78 about the drive axis 74. A cam 86 is coupled for co-rotation with the drive shaft 82. The cam 86 includes a contact surface 90 at its outer periphery. The contact surface 90 engages a follower or roller 94, which in turn is coupled to the mandrel 50 via a pin 98 extending vertically through the mandrel 50. The follower 94 is biased into engagement with the contact surface 90 of the cam 86 by a spring 102 acting on the mandrel 50.

The contact surface 90 of the cam 86 has a variable radius such that rotation of the cam 86 moves the follower 94 to reciprocate the mandrel 50 along the mandrel axis 54. The cam 86, follower 94, spring 102, and mandrel 50 are supported within a frame 104, which may be similar to the frame 627 described and illustrated in U.S. Patent Application Publication No. 2020/0261959, filed as application Ser. No. 16/795,742 on Feb. 20, 2020, in the name of Milwaukee Electric Tool Corporation, the entire content of which is incorporated herein by reference.

The mandrel 50 includes a conical outer surface 106 engageable with a head or working element 110 of the expansion tool 10 (FIG. 1). In the illustrated embodiment, the working element 110 includes a plurality of jaws 114. The conical outer surface 106 of the mandrel 50 (FIG. 2) is engageable with interior sides of the jaws 114 as the mandrel 50 moves from a retracted position to an extended position along the mandrel axis 54. This expands the jaws 114 radially outward from a closed position (illustrated in FIG. 1) to an expanded position. The jaws 114 may be biased toward the closed position (e.g., by an O-ring or toroidal spring surrounding the jaws 114, by tension springs interconnecting adjacent jaws 114, or by any other suitable arrangement), such that the jaws 114 return to the closed position when the mandrel 50 retracts along the mandrel axis 54.

Referring to FIG. 1, each of the jaws 114 has an exterior side with a tapered portion 118 and a sizing portion 122. When the working element 110 is in the closed position, adjacent jaws 114 abut one another such that the tapered portions 118 define a generally frustoconical shape. The sizing portions 122 collectively define a constant diameter or maximum cross-sectional dimension when the jaws 114 are in the closed position, with the diameter being sized for proper expansion of PEX tubing of a desired nominal size. In other embodiments, the jaws 114 may be formed with other linear and/or non-linear profiles along the length of each jaw 114. In some embodiments, the working element 110 may be removably coupled to the expansion tool 10 such that the jaws 114 may be interchanged with jaws having other sizes/geometries. For example, the working element 110 may be part of an expansion tool system including a plurality of interchangeable working elements, such as the expansion tool system 905 described and illustrated in U.S. Patent Application Publication No. 2020/0261959, which, as discussed above, is incorporated by reference.

The expansion tool 10 may include an automatic jaw rotation mechanism 200, such as the automatic jaw rotation mechanism 200 described and illustrated in U.S. patent application Ser. No. 17/187,265, filed Feb. 26, 2021, in the name of Milwaukee Electric Tool Corporation, the entire content of which is incorporated herein by reference. The automatic jaw rotation mechanism 200 is configured to automatically rotate the jaws 114 of the working element 110 about the mandrel axis 54 during operation of the expansion tool 10.

Figure 5:
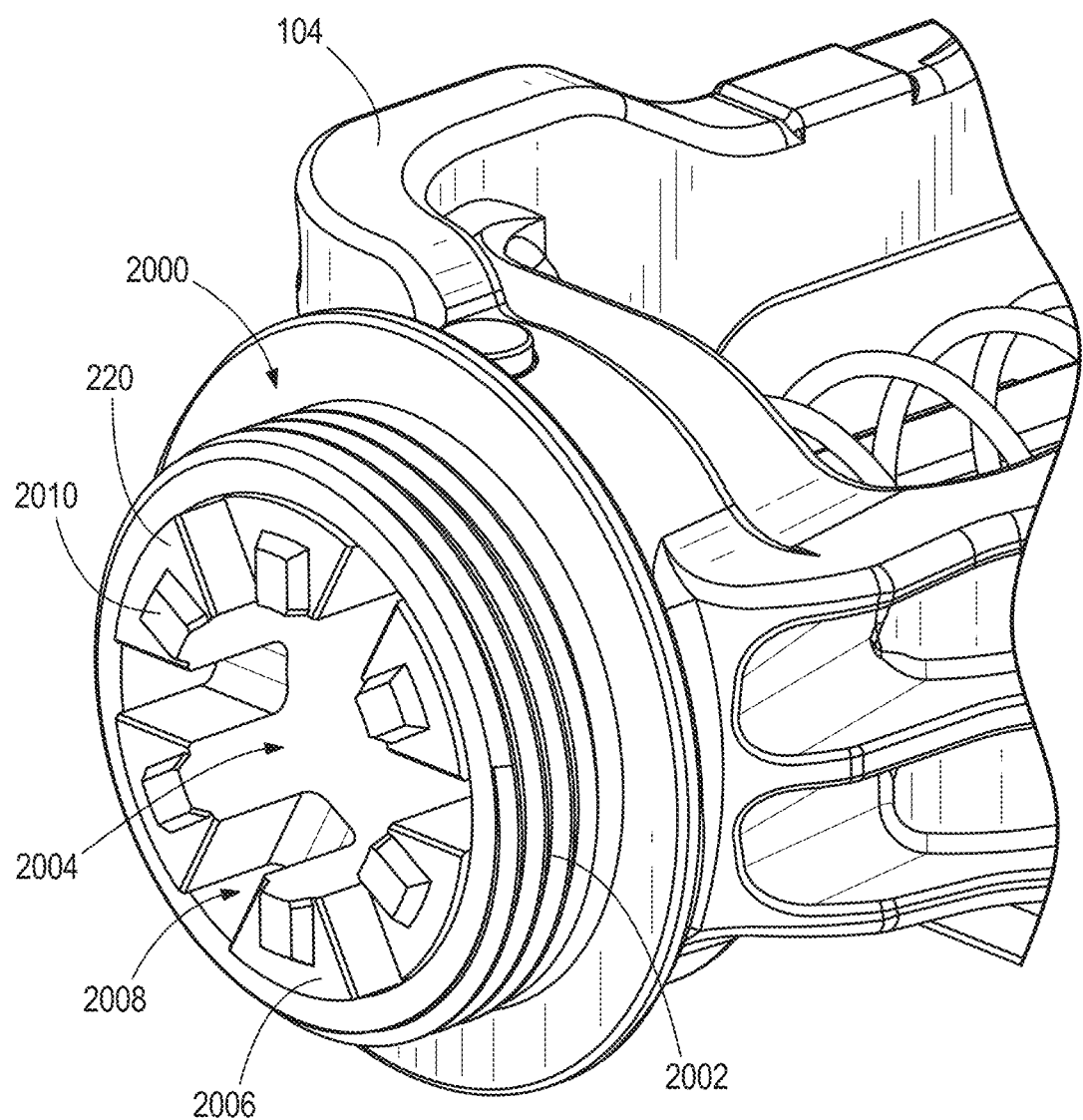
FIG. 5 is a perspective view of a portion of the expansion tool of FIG. 1, illustrating a rotation collar.

Referring to FIG. 5, in the illustrated embodiment, the automatic jaw rotation mechanism 200 includes a rotation collar 220 rotatably supported by the frame 104 adjacent a connection end 2000 of the frame 104. The connection end 2000 includes a set of external threads 2002. The rotation collar 220 includes a central bore 2004 which allows the mandrel 50 to pass through the rotation collar 220 and engage the jaws 114. The rotation collar 220 includes an end face 2006 having a plurality of slots 2008 extending from the end face 2006 in an axial direction (i.e. a rearward direction). A plurality of teeth 2010 extends forwardly from the end face 2006. The teeth 2010 are arranged such that each tooth 2010 is disposed between an adjacent pair of slots 2008. The illustrated teeth 2010 are formed as truncated pyramids. In other embodiments, the teeth 2010 may be formed in other suitable shapes.

Figure 6A:
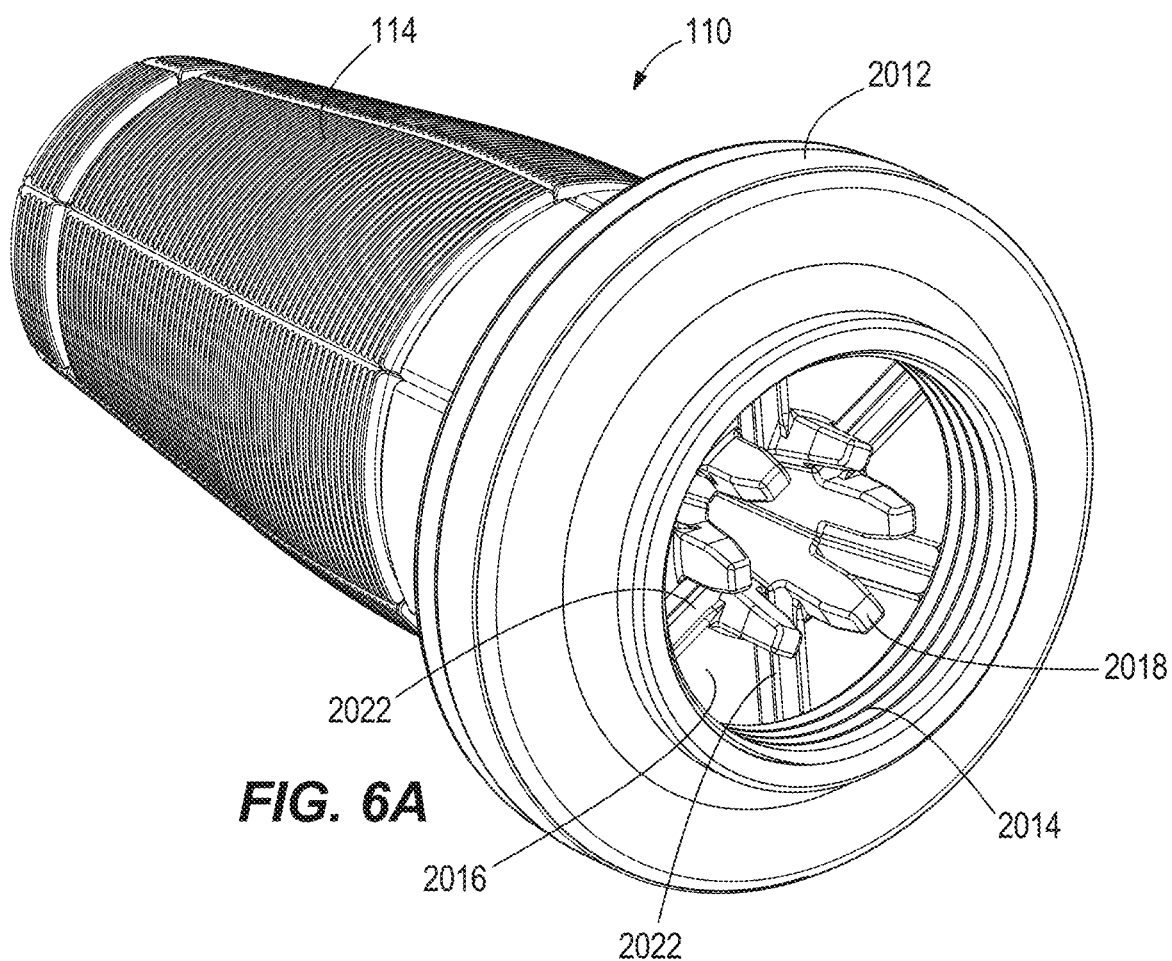
FIG. 6A is a perspective view illustrating a first embodiment of a head for use with the expansion tool of FIG. 1.
Figure 7:
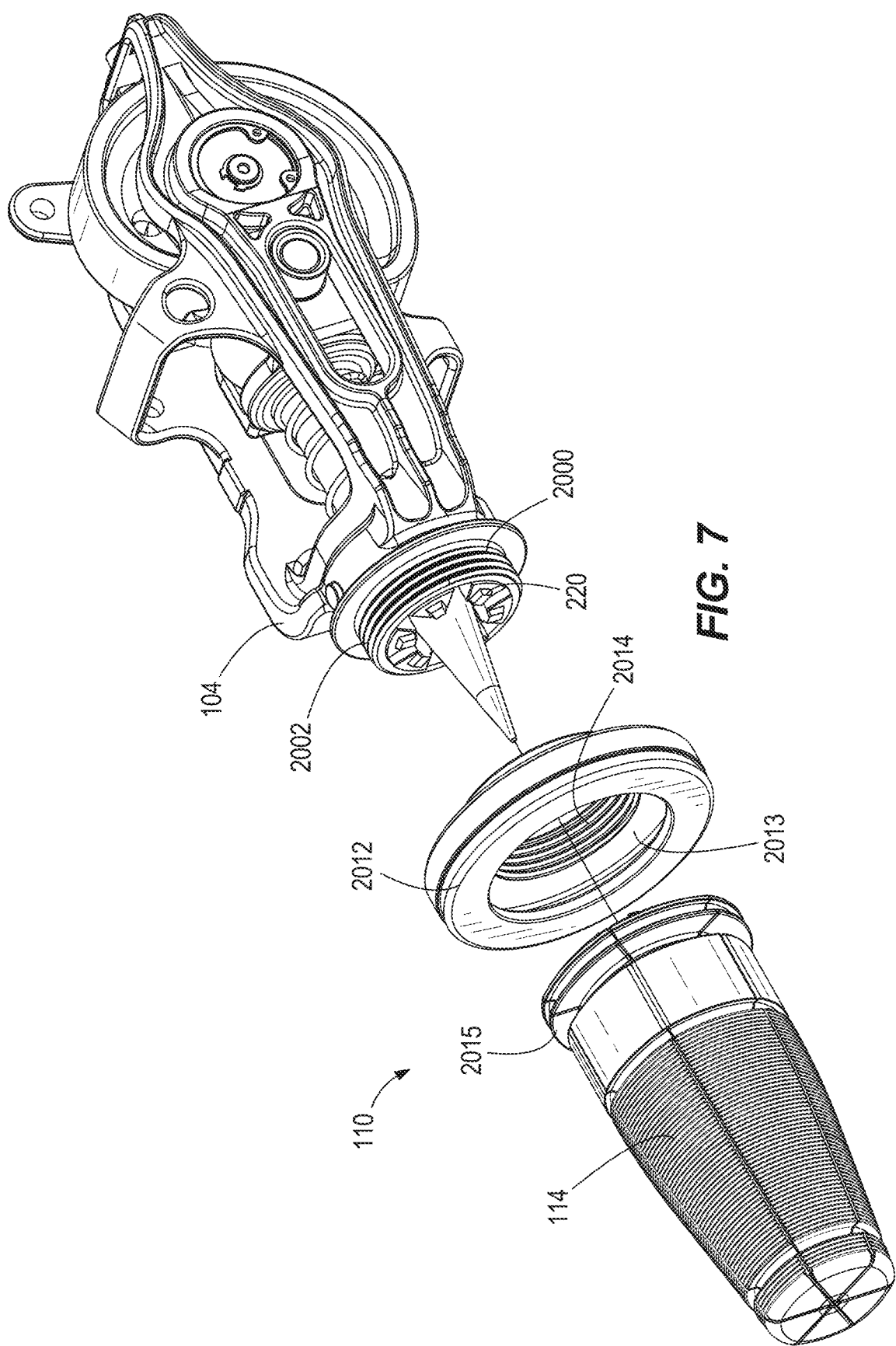
FIG. 7 is an exploded view illustrating a portion of the expansion tool of FIG. 1 including the rotation collar and the head.

With reference to FIGS. 6A and 7, the working element 110 is removably coupled to the frame 104 by a retaining sleeve 2012. The retaining sleeve 2012 includes an internal groove 2013 and a set of internal threads 2014. Each of the jaws 114 includes a flange 2015 that is received within the internal groove 2013 of the retaining sleeve 2012. The jaws 114 are rotatable relative to the retaining sleeve 2012, as the flanges 2015 are slidable within the internal groove 2013. The internal threads 2014 of the retaining sleeve 2012 cooperate with the external threads 2002 of the connection end 2000 to removably couple the retaining sleeve 2012 to the frame 104

Referring to FIG. 6A, each of the jaws 114 of the working element 110 includes a base surface 2016, which faces rearward when the working element 110 is coupled to the expansion tool 10. The base surface 2016 includes a projection or tab 2018 and two grooves 2022 located on either side of the tab 2018, along the edges of the base surface 2016. When the tabs 2018 are tapered outward in the rearward direction to match the profile of the conical outer surface 106 mandrel 50.

Figure 8:
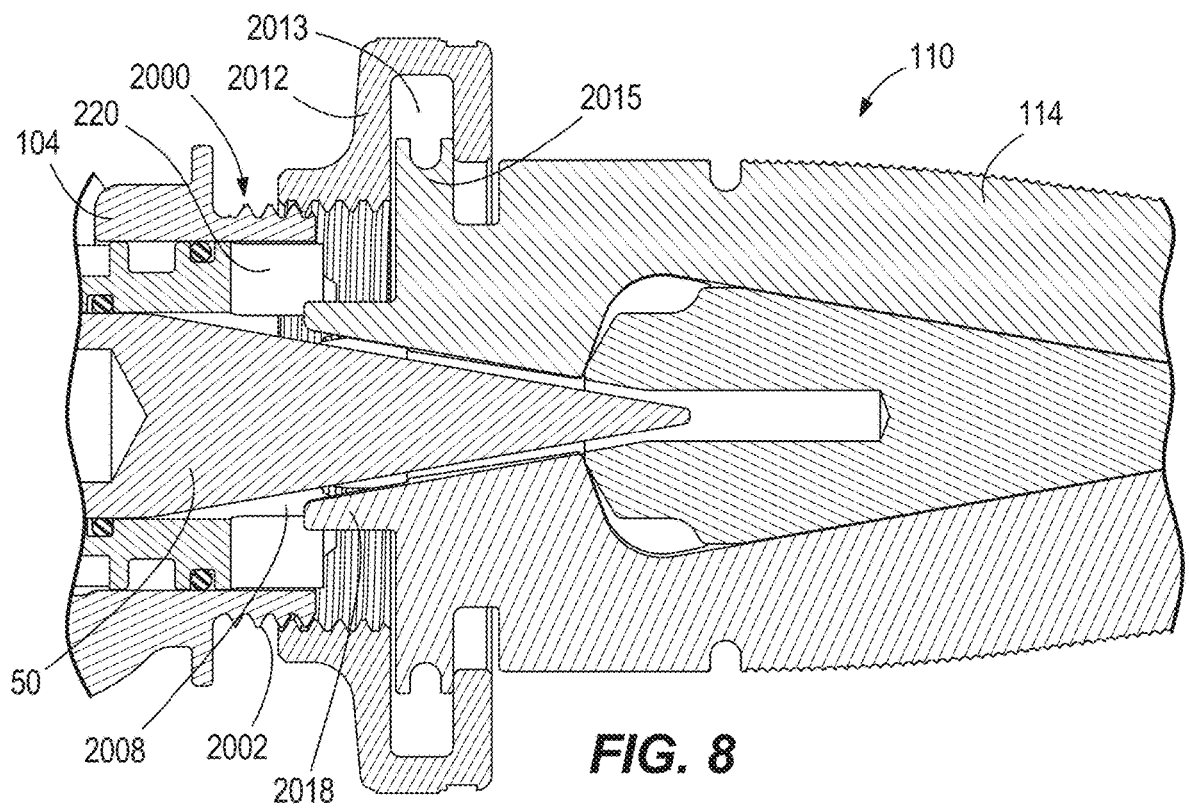
FIG. 8 is a cross-sectional view illustrating the head of FIG. 6B in a partially installed position on the expansion tool of FIG. 1.
Figure 9:
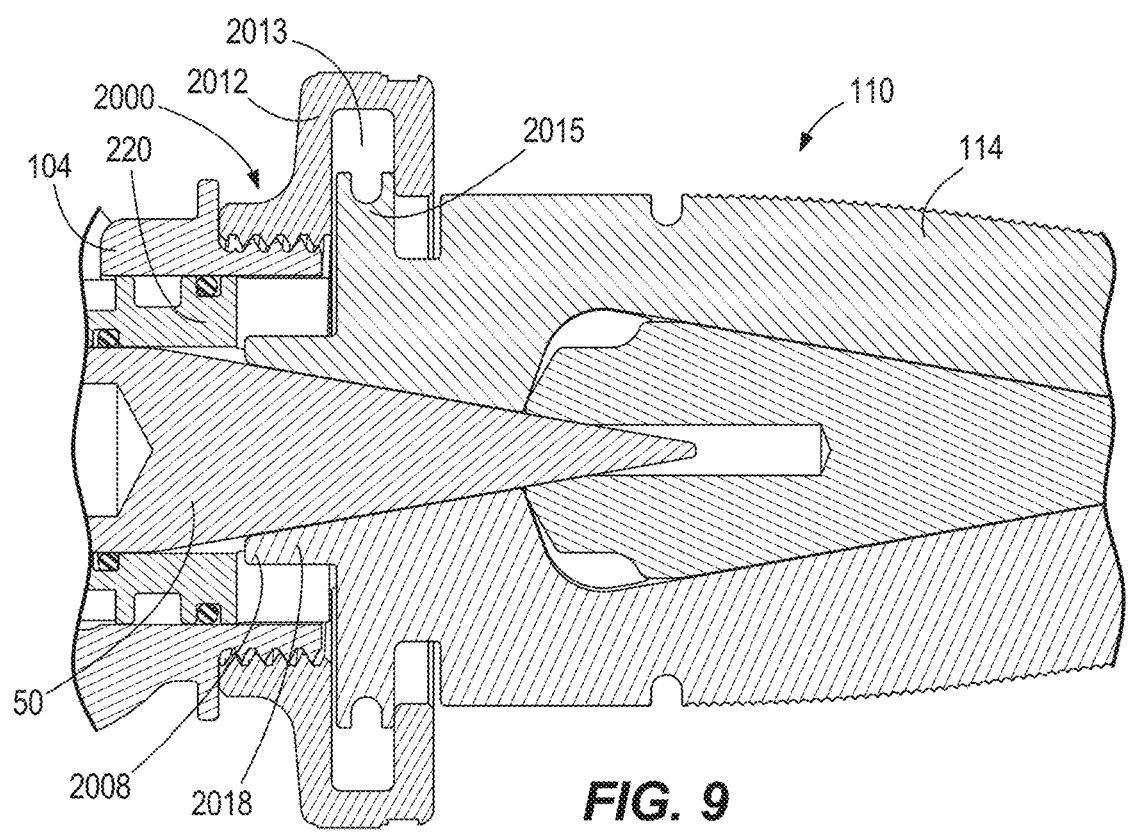
FIG. 9 is a cross-sectional view illustrating the head of FIG. 6B in a fully installed position on the expansion tool of FIG. 1.

As illustrated in FIGS. 8 and 9, when attaching the working element 110 to the expansion tool 10, an operator positions the retaining sleeve 2012 adjacent the connection end 2000 of the frame. In order to couple the jaws 114 to the rotation collar 220, the tabs 2018 of the jaws 114 must align with the slots 2008 formed in the end face 2006 of the rotation collar 220. As shown in FIG. 8, the jaws 114 can then be rotated relative to the retaining sleeve 2012 and the frame 104 until the tabs 2018 are aligned with the slots 2008, at which point the retaining sleeve 2012 can be rotated relative to the frame 104 to begin threading the retaining sleeve 2012 on to the external threads 2002 of the connection end 2000.

Continued rotation of the retaining sleeve 2012 in a tightening direction causes the tabs 2018 to travel further into the slots 2008, thereby rotatably coupling the rotation collar 220 and the jaws 114. Once the retaining sleeve 2012 is fully installed on the connection end 2000, the teeth 2010 (FIG. 5) engage the grooves 2022 (FIG. 6A) to provide an additional torque-transmitting connection between the rotation collar 220 and the jaws 114.

In operation, the jaws 114 (FIG. 1) of the expansion tool 10 are inserted into an end of a segment of PEX tubing to be expanded such that the tapered portions 118 abut an interior wall of the PEX tubing. The operator depresses the actuator 26, which energizes the motor 30.

Once energized, the motor 30 rotates the cam 86 via the drive mechanism 34 to perform cycles of axially extending and retracting the mandrel 50 along the mandrel axis 54 (FIG. 2), thereby expanding and contracting the jaws 114. As the jaws 114 expand, the tapered portions 118 engage with the interior wall of the PEX tubing to gradually expand the PEX tubing. The expansion tool 10 continues the cycles of axially extending and retracting the mandrel 50. The operator pushes the jaws 114 deeper into the PEX tubing with each successive expansion until the sizing portions 122 of the jaws 114 are fully inserted into the PEX tubing. This indicates to the operator that expansion is complete. The jaws 114 are withdrawn from the PEX tubing, and the operator inserts a fitting into the end of the PEX tubing. The interior of the PEX tubing then elastically recovers and secures the fitting in place.

The automatic rotation mechanism 200 operates to incrementally rotate the jaws 114 during each cycle of axially extending and retracting the mandrel 50. The automatic rotation mechanism 200 incrementally rotates the rotation collar 220. As the rotation collar 220 rotates, the slots 2008 engage the tabs 2018 and transfer the rotation to the jaws 114. The engagement between the tabs 2018 and the slots 2008 ensure that rotation is transferred without any slippage. Additionally, the teeth 2010 engage the grooves 2022 to provide an additional torque-transmitting connection between the rotation collar 220 and the jaws 114. The retaining sleeve 2012 remains stationary and retains the jaws 114 adjacent the connection end 2000 of the frame 104.

The jaws 114 are preferably incrementally rotated during each retraction cycle by an angular displacement that is less than the angular spacing of the jaws 114. For example, when the working element 110 includes six jaws, the jaws are spaced by sixty degrees, and the automatic rotation mechanism 200 is operable to rotate the jaws 114 by an angular displacement less than sixty degrees during each retraction cycle. In some embodiments, the jaws 114 are rotated by an angular displacement less than 45 degrees, and in some embodiments, the jaws 114 are rotated by an angular displacement less than 20 degrees.

By rotating the jaws 114 by an angular displacement that is less than the angular spacing of the jaws 114, the jaws 114 smooth out any indentations that may be formed on the interior wall of the PEX tubing during expansion. This promotes a quality seal with the subsequently inserted fitting. Furthermore, by rotating the jaws 114 while the jaws 114 are retracting, friction between the jaws 114 and the PEX tubing is reduced. In addition, rotating the jaws 114 simultaneously while the jaws 114 are retracting advantageously reduces the cycle time of the expansion tool 10.

Figure 6B:
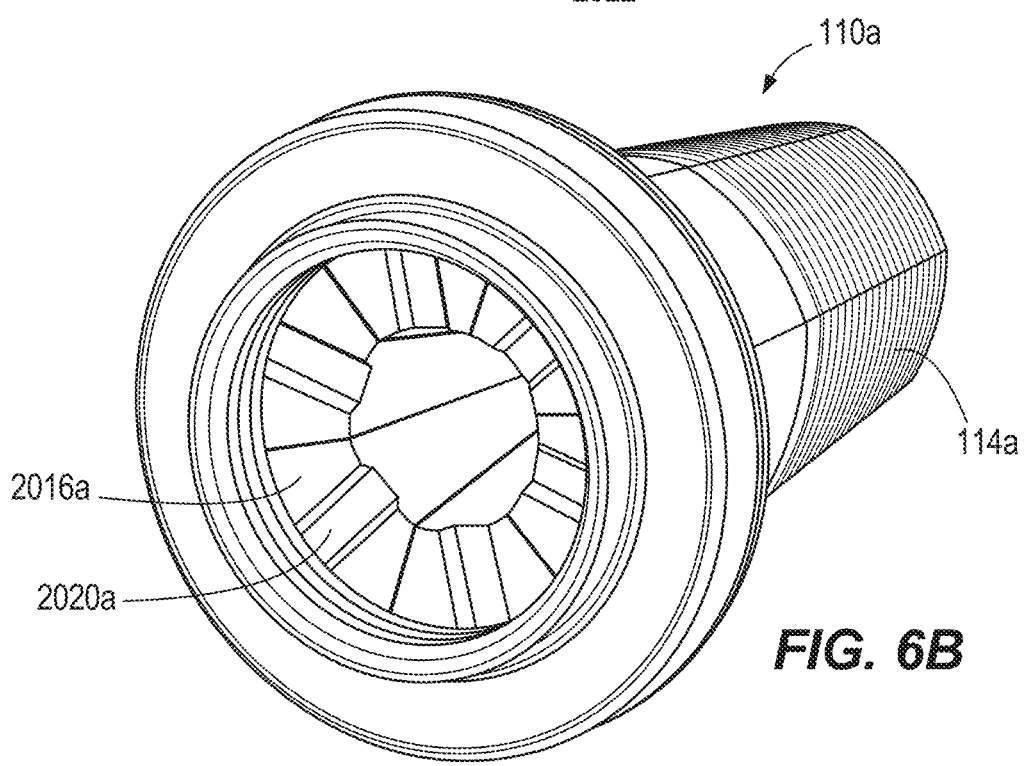
FIG. 6B is a perspective view illustrating a second embodiment of a head for use with the expansion tool of FIG. 1.

FIG. 6B illustrates a conventional working element 110a, which may alternatively be coupled to the expansion tool 10. The working element 110a does not include the tabs 2018 and instead only includes the grooves 2020a formed on the base surfaces 2016a of the jaws 114a. Because the rotation collar 220 includes the teeth 2010, the teeth 2010 are received within the grooves 2020a when the working element 110a is coupled to the frame 104 to couple the jaws 114a for co-rotation with the rotation collar 220. Thus, the rotation collar 220 of the expansion tool 10 is advantageously backwards-compatible with conventional working elements, such as the working element 110a.

FIGS. 10A and 11A illustrate additional embodiments of working elements 110b and 110c which may be coupled to the expansion tool 10 (e.g., by the retaining sleeve 2012). In each case, the interior sides of jaws 114 define an interior cavity 126 in which an inner cone 130a (FIG. 10A), 130b (FIG. 10B) is disposed. The inner cone 130a, 130b defines an outer conical surface 134 that abuts and engages the interior sides of the jaws 114 and an inner bore 138 that extends at least partially along the length of the inner cone 130 along a conical axis 142.

The inner cone 130a, 130b is engageable with the mandrel 50 and slidable along the mandrel axis 54 therewith. More specifically, the mandrel 50 engages the inner cone 130a, 130b with the mandrel 50 at least partially disposed in the inner bore 138 of the inner cone 130a, 130b. As the mandrel 50 engages the inner cone 130a, 130b and proceeds in a linear direction along the mandrel axis 54, the inner cone 130a, 130b engages the interior sides of jaws 114 thereby transitioning the jaws from the closed position (e.g., shown in FIG. 9) to the expanded position (as shown in FIGS. 10A and 11A).

As shown in FIGS. 10B and 11B, the inner cone 130a, 130b may include features for distributing and/or retaining lubricant (such as grease, oil, or other appropriate material for reducing friction between surfaces moving relative to one another) at the interface of the outer conical surface 134 of the inner cone 130a, 130b and the interior sides of jaws 114.

For example, as shown in FIG. 10B, the inner cone 130a includes a plurality of bores 146 extending from the outer conical surface 134 to the inner bore 138 and fluidly communicating with the inner bore 138, such that lubricant is allowed to move through the inner bore 138 at the engagement with the mandrel 50 to the outer conical surface 134 via bores 146. Lubricant is thereby applied at the interface of the outer conical surface 134 and the interior sides of jaws 114.

In another example, as shown in FIG. 11B, the inner cone 130b includes a plurality of grooves 150 disposed on the outer conical surface 134 spaced along the conical axis 142 and extending circumferentially about the outer conical surface 134 and radially inward toward the inner bore 138. Lubricant may be disposed in the grooves 150 whereby the interface of the outer conical surface 134 and the interior sides of jaws 114 is maintained in a lubricated state.

Various features and aspects of the present invention are set forth in the following claims.

What is claimed is:

1. An expansion tool, comprising:
   a housing;
   a collar rotatably coupled to the housing, the collar including a plurality of slots;
   a plurality of jaws, each jaw having a projection received in a corresponding one of the plurality of slots such that the jaws are coupled for co-rotation with the collar;
   a mandrel moveable relative to the housing between a retracted position and an extended position, the mandrel engageable with the jaws to expand the jaws in response to movement of the mandrel to the extended position;
   a drive mechanism including a rotatable cam, wherein rotation of the cam moves the mandrel between the retracted position and the extended position;
   a cone received within the plurality of jaws and engageable with inner surfaces of the plurality of jaws, wherein the mandrel is configured to engage the cone to move the cone with the mandrel to expand the jaws as the mandrel moves toward the extended position; and
   a rotation mechanism configured to incrementally rotate the collar.

2. The expansion tool of claim 1, wherein the collar includes a front surface facing the jaws, and wherein the slots extend in a rearward direction from the front surface.

3. The expansion tool of claim 2, wherein the collar includes a plurality of teeth extending in a forward direction from the front surface.

4. The expansion tool of claim 3, wherein the plurality of jaws is removably coupled to the housing.

5. The expansion tool of claim 4, wherein the housing at least partially encloses a frame having a connection end, wherein the expansion tool further comprises a retaining sleeve surrounding the plurality of jaws, and wherein the plurality of jaws is configured to be coupled to the housing by coupling the retaining sleeve to the connection end of the frame.

6. The expansion tool of claim 5, wherein the retaining sleeve is configured to be threadably coupled to the connection end.

7. The expansion tool of claim 4, wherein the plurality of jaws is a first plurality of jaws, and the first plurality of jaws is interchangeable with a second plurality of jaws.

8. The expansion tool of claim 7, wherein each jaw of the second plurality of jaws includes a recess formed in a rear surface of the jaw, and each recess is configured to receive a corresponding one of the plurality of teeth to couple the second plurality of jaws for co-rotation with the collar.

9. The expansion tool of claim 1, wherein the drive mechanism is operable in a high speed configuration and a low speed configuration, and wherein the expansion tool further comprises:
   a shifting assembly including an actuator operable to shift the drive mechanism between the high speed configuration and the low speed configuration; and
   a shifting detector configured to detect a shift between the high speed configuration and the low speed configuration.

10. The expansion tool of claim 1, wherein the cone includes a plurality of grooves containing grease to lubricate the inner surfaces of the plurality of jaws.

11. The expansion tool of claim 1, wherein the cone includes a plurality of bores extending from an outer conical surface to an inner bore, the bores defining fluid pathways to convey lubricant between the inner bore and an outer surface of the cone.

12. An expansion tool comprising:
   a housing;
   a plurality of jaws,
   a mandrel moveable relative to the housing between a retracted position and an extended position, the mandrel engageable with the jaws to expand the jaws in response to movement of the mandrel to the extended position;
   a drive mechanism including a rotatable cam, wherein rotation of the cam moves the mandrel between the retracted position and the extended position, and wherein the drive mechanism is operable in a high speed configuration and a low speed configuration;
   a shifting assembly including an actuator operable to shift the drive mechanism between the high speed configuration and the low speed configuration; and
   a shifting detector configured to detect a shift between the high speed configuration and the low speed configuration.

13. The expansion tool of claim 12, wherein the shifting detector includes a micro switch.

14. The expansion tool of claim 13, wherein the shifting assembly includes a shifting arm engageable with the micro switch.

15. The expansion tool of claim 12, further comprising a motor configured to rotate the rotatable cam via the drive mechanism and a controller in communication with the shifting detector, wherein the controller is configured to deenergize the motor in response to the shifting detector detecting the shift.

16. The expansion tool of claim 15, further comprising an indicator, wherein the controller is configured to illuminate the indicator in response to the shifting detector detecting the shift.

17. The expansion tool of claim 12, wherein the drive mechanism includes a multi-stage planetary transmission, wherein the transmission includes a movable ring gear and a locking ring, wherein the movable ring gear is engaged with the locking ring in the low speed configuration, and wherein the movable ring gear is disengaged from the locking ring in the high speed configuration.

18. The expansion tool of claim 12, wherein each of the jaws includes a projection extending from a rearward face of the jaw, and wherein each of the jaws includes a groove in the rearward face of the jaw.

19. An expansion tool, comprising:

a housing;

a collar rotatably coupled to the housing;

a plurality of jaws coupled for co-rotation with the collar;

a mandrel moveable relative to the housing between a retracted position and an extended position, the mandrel engageable with the jaws to expand the jaws in response to movement of the mandrel to the extended position;

a cone received within the plurality of jaws and engageable with inner surfaces of the plurality of jaws, wherein the mandrel is configured to engage the cone to move the cone with the mandrel to expand the jaws as the mandrel moves toward the extended position; and a drive mechanism operable to move the mandrel between the retracted position and the extended position, wherein the cone includes means for containing grease to lubricate the inner surfaces of the plurality of jaws.

* * * * *